(12) United States Patent
Kopp

(10) Patent No.: US 6,547,668 B2
(45) Date of Patent: Apr. 15, 2003

(54) LABYRINTH SEAL FOR A UNIVERSAL JOINT SHAFT

(75) Inventor: Markus Kopp, Friolzheim (DE)

(73) Assignee: G. Elbe & Sohn GmbH & Co. KG, Breitigheim-Bissingen (DE)

( * ) Notice: Subject to any disclaimer, the term of this patent is extended or adjusted under 35 U.S.C. 154(b) by 59 days.

(21) Appl. No.: 09/818,069

(22) Filed: Mar. 27, 2001

(65) Prior Publication Data

US 2001/0034270 A1 Oct. 25, 2001

(30) Foreign Application Priority Data

Mar. 29, 2000 (DE) .......................... 100 15 571

(51) Int. Cl.⁷ ................................ F16D 3/16
(52) U.S. Cl. ....................... 464/133; 277/615
(58) Field of Search ................ 464/133, 128, 464/131, 132; 277/615, 605, 562, 628, 630, 634, 635, 641

(56) References Cited

U.S. PATENT DOCUMENTS

| | | | | |
|---|---|---|---|---|
| 3,446,507 A | * | 5/1969 | Ulics ................ | 464/131 |
| 3,857,589 A | * | 12/1974 | Oostenbrink ........ | 277/615 |
| 4,337,628 A | * | 7/1982 | Greene ............. | 464/131 |
| 4,377,312 A | | 3/1983 | Zackrisson ......... | 308/187.1 |
| 4,440,401 A | * | 4/1984 | Olschewski et al. . | 464/131 |
| 4,710,150 A | * | 12/1987 | Mangiavacchi ..... | 464/131 |
| 4,834,691 A | * | 5/1989 | Schultze et al. .... | 464/131 |
| 4,903,971 A | | 2/1990 | Bauer .............. | 277/152 |
| 5,407,387 A | | 4/1995 | Mazziotti et al. ... | 464/131 |
| 5,588,915 A | | 12/1996 | Smith | |
| 5,626,520 A | | 5/1997 | Mazziotti ......... | 464/131 |
| 6,036,541 A | * | 3/2000 | Koumatsu ......... | 277/615 |
| 6,095,925 A1 | * | 8/2001 | Smith .............. | 464/131 |

FOREIGN PATENT DOCUMENTS

| | | |
|---|---|---|
| DE | 4128179 | 2/1993 |
| DE | 4408831 | 9/1995 |
| DE | 8416023 | 5/1997 |
| DE | 19637553 | 11/1997 |
| WO | 9306378 | 4/1993 |

\* cited by examiner

Primary Examiner—Lynne H. Browne
Assistant Examiner—Kenneth L Thompson
(74) Attorney, Agent, or Firm—Davidson, Davidson & Kappel, LLC

(57) ABSTRACT

A seal for a universal joint cross trunnion is accommodated in a bearing bush for a universal joint shaft and has an outer and an inner, ring-shaped, sealing body which are insertable into the bearing bush and operatively connected, and which permit mutual adjustment. The two sealing bodies include meshing sealing elements having a positive-locking design. The inner sealing body includes an enveloping part which overlaps the other sealing body and/or the bearing bush at least partially.

14 Claims, 3 Drawing Sheets

LABYRINTH SEAL FOR A UNIVERSAL JOINT SHAFT

FIELD OF THE INVENTION

The present invention relates generally to a seal for a universal joint cross trunnion, and in particular to a seal for a universal joint cross trunnion accommodated in a bearing bush for a universal joint shaft, the seal having an outer and an inner, ring-shaped, sealing body which are insertable into the bearing bush and operatively connected, and which permit mutual adjustment.

RELATED TECHNOLOGY

A sealing arrangement (German Patent No. DE 44 08 831 A1) for a bearing of a trunnion in a bearing bush for antifrictionally supported universal joints is known, the sealing arrangement being composed of a reinforced rotary shaft seal which is nonrotatably inserted into a bore of the bearing bush and engages on the trunnion via a sealing lip. Moreover, the sealing arrangement has a further reinforced sealing ring which is arranged in the region of an open end of the bearing bush in a manner that it nonrotatably engages on a shoulder of the trunnion and which is provided with a sealing lip directed toward the bearing bush. As a further component part, the sealing arrangement features a sealing cap which is retained on an outside wall of the bearing bush in a positive-locking manner and which forms a labyrinth gap with a reinforcement of the sealing ring. In this context, the prestress of the sealing lips, provided that they engage on a purely cylindrical step, is influencable only by the diameter tolerances of the respective component parts of the universal joint cross assembly, and can consequently be met. However, since, for manufacturing reasons, the transitions at the individual step changes are rounded, the cylindrical sealing surfaces are shortened in the axial direction, and the possibility of arranging a plurality of such sealing lips one after the other for improving the sealing effect in this manner is limited to the greatest possible extent.

Sealing systems in which the main sealing takes place on a conical transition between the cylindrical rolling body surface of the universal joint cross trunnion and the central universal joint cross body are known from German Patents Nos. DE 41 31 694 A1 and DE 196 54 234 A1. In this context, the required prestress can be met only with difficulty because of a possible addition or subtraction of manufacture-related length and diameter tolerances of the respective component parts of the universal joint cross assembly. Therefore, sealing systems of this kind possess an additional seal which is arranged before the main seal and which, on one hand, protects the main seal from direct contact with foreign matter and, on the other hand, is intended to increase the sealing effect. As a rule, these additional seals are stationarily arranged at the transition between the cylindrical rolling body surface of the universal joint cross trunnion and the central universal joint cross body. Their sealing lips are arranged in such a manner that the sealing takes place on the bearing bush of the main seal or a combination of bearing bush and main seal.

Another problem in sealing a universal joint cross assembly is the contour of the universal joint since, for manufacturing reasons, the transition between the cylindrical rolling body contact surface of the universal joint cross trunnion and the central universal joint cross body is conically rounded or designed in a step-shaped manner, including a cone or radius, or a step change, respectively. This transition between the universal joint cross trunnion and the central universal joint cross body serves as the sealing surface of the main seal, one or a plurality of sealing lips of the sealing system which, as a rule, is stationarily joined to the universal joint cross bush, engaging on the sealing surface with a specific prestress. This prestress must be guaranteed for functional reasons, since too low a prestress permits foreign matter to ingress into the bearing and excessive prestress gives rise to increased wear by abrasion, thus resulting in a premature bearing failure in both cases.

SUMMARY OF THE INVENTION

An object of the present invention is to configure and arrange the seal for a universal joint cross trunnion accommodated in a bearing bush in such a manner that a substantially long-lasting seal and, consequently, an improvement of the service life are achieved.

The present invention provides a seal for a universal joint cross trunnion (1) accommodated in a bearing bush (2) for a universal joint shaft, the seal having an outer and an inner, ring-shaped, sealing body (4, 5) which are insertable into the bearing bush (2) and operatively connected, and which permit mutual adjustment, wherein the two sealing bodies (4,5) feature meshing sealing elements (9) having a positive-locking design, at least the one sealing body (5) having an enveloping part (7) which overlaps the other sealing body (4) and/or the bearing bush (2) at least partially.

According to the present invention, the two sealing bodies feature meshing sealing elements having a positive-locking design, at least the one sealing body having an enveloping part which overlaps the other sealing body and/or the bearing bush at least partially. For this, it is advantageous for the two mutually opposing sealing bodies to have intermeshing sealing lamellae having a labyrinth-like design.

By the expedient design and arrangement of the two sealing bodies including the meshing, positive locking sealing elements and the appertaining enveloping part, a simple but very effective sealing device is provided in an inexpensive manner which ensures a long-lasting seal and, consequently, a substantial improvement of the service life.

According to a further development, an additional possibility lies in that the sealing bodies have one or a plurality of supporting elements, at least one supporting element resting on the universal joint cross trunnion in the region of a cone transition. In this manner, it is achieved that the sealing no longer takes place directly on the universal joint cross trunnion but via the intermeshing lamellar or labyrinth-shaped sealing elements which are in mesh or in operative connection with each other. In this context, it is advantageously possible for the outer sealing body to be joined to the bearing bush and for the inner sealing body to be joined to the universal joint cross via a force fit so that ingress of foreign matter or lubricant loss at the joining locations are prevented. To manufacture this sealing system which is composed of the outer sealing body and of the inner sealing body which both have a ring-shaped design, the outer sealing body can be manufactured in a cutting or non-cutting manner and subsequently be inserted into an injection mold on which, additionally, the contour of the inner sealing body is left open. In this manner, the inner sealing body can be injected so that is slightly shrinks while cooling down. Because of this, a labyrinth gap forms between the two sealing bodies which guarantees that inner and outer rings can be rotated relative to each other without producing large frictional losses. Prior to injecting the inner sealing body, a release agent is applied to prevent the two sealing bodies from sticking together. In this context, it is advantageous for the mutually opposing surfaces to have no irregularities, which likewise makes it possible to reduce frictional losses.

Moreover, it is advantageous for the two supporting elements to be arranged at a distance from each other, and for the second supporting element to rest on an inclined cone surface which is contiguous to the cone transition. By advantageously using the two supporting elements which are arranged at a distance from each other, these supporting elements can easily be mounted on the surface of the universal joint cross trunnion in the transition region between the cylindrical part of the universal joint cross trunnion and the cone transition, thus making it possible to obtain a perfect seal, in particular if these supporting elements are pressed against the surface of the universal joint cross trunnion with prestress.

It is also expedient that a chamber or recess directed toward the surface of the universal joint cross trunnion is formed between the two supporting elements. Because of the varying numbers of sealing lamellae or of the supporting elements which act as sealing lamellae, it is possible for the main seal to be adapted to different contours and conditions at the universal joint shaft or at the universal joint cross trunnion. Furthermore, it is possible to increase or reduce the height of the supporting elements or of the lamellar sealing elements without difficulty so that the cross-sectional height of the main sealing region can likewise be increased or reduced. Because of the reduction of the total mass of the sealing elements, structural space is gained, thus allowing the sealing elements to be placed on a step of a universal joint cross trunnion having a step-shaped design without difficulty, as a result of which the structural space available for the rolling element bearing arrangement can be enlarged.

In a preferred embodiment according to the present invention, provision is made for the enveloping part arranged on the inner sealing body to have an annular space which runs coaxially to a center axis and serves for receiving a ring-shaped extension arranged on the bearing bush.

According to the present invention, a ring-shaped extension arranged at the outer sealing body has a recess which is rectangular in cross-section and into which the outer part of the enveloping part is insertable.

Faces of the extension and of the recess running approximately parallel relative to a transverse plane may form in each case a ring gap with faces of the enveloping part of the annular space and of the annular space. Via the advantageous material selection and dimensioning, which both influence the individual force fits, it is possible to control the size of the labyrinth gap and thus attain the advantage that the main sealing effect is influenced only by the diameter tolerances. During assembly, both the outer and the inner sealing bodies are pressed onto their respective component parts and deformed within the elastic range. In the process, the labyrinth gap of the sealing system can be reduced again. By advantageously selecting these influence variables, it is possible for the friction between the inner and the outer sealing bodies to be minimized, thus resulting in a substantially wear-free seal.

The enveloping part and the two supporting parts may form the one-part sealing body which is composed of an elastomeric material and is pressed at least onto the universal joint cross trunnion and/or onto a cone part.

In addition, it is expedient for at least one supporting element to be designed as a sealing lip which rests on the cone part with prestress, and for the intermeshing sealing lamellae to extend approximately in the direction of or parallel to a transverse plane.

To limit the complexity of the sealing system according to the present invention, it is beneficial that the bearing bush features a bottom having an inner face, and that rolling elements are provided between this face and the inner faces of the sealing bodies for accommodating the universal joint cross trunnion, and that the ring-shaped extension of the bearing bush is inserted into the annular space of the inner sealing body.

An additional seal is obtained by a sealing lip premolded on the inner ring of the sealing body in conjunction with the universal joint cross cone. Due to the press fit of the inner sealing body on the universal joint cross trunnion, foreign bodies cannot ingress into the interior of the bearing bush. By the overlapping or enveloping part which encircles the other sealing body and/or the bearing bush at least partially, an additional seal is formed which advantageously protects, on one hand, the main seal having a labyrinth-shaped design and, on the other hand, the force fit between outer ring and bearing bush against foreign matter. The recess between the two supporting or sealing elements permits optimum control of the contact pressure in this region. Moreover, it is possible to insert a ring composed of elastomers into this recess and to achieve an additional sealing effect in this manner.

BRIEF DESCRIPTION OF THE DRAWINGS

Further advantages and details of the present invention will be elaborated upon below with reference to the drawings.

DETAILED DESCRIPTION

Figure 2:
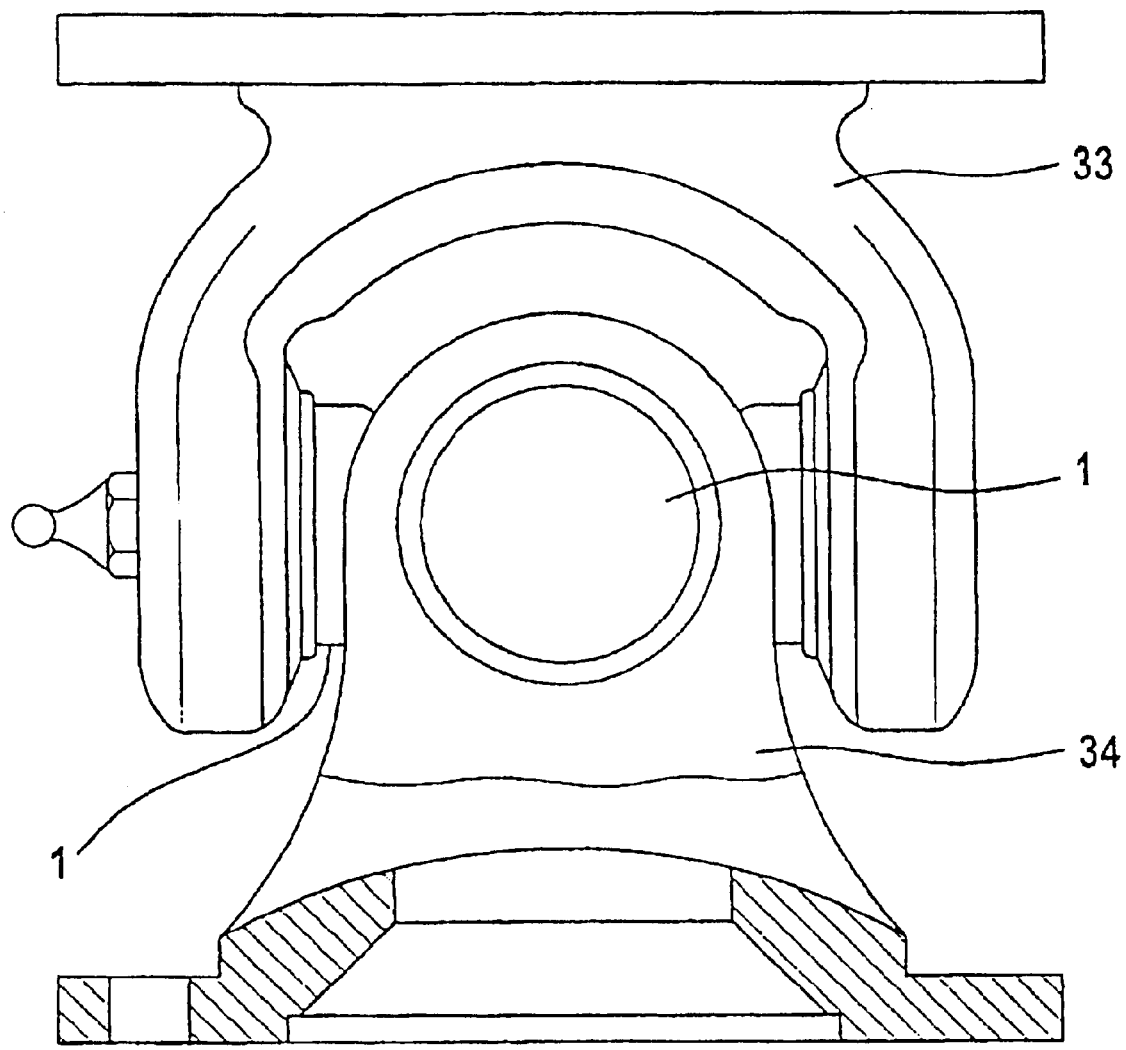
FIG. 2 shows a schematic, partially sectional representation of a universal joint.

In the drawing, a universal joint is schematically represented in FIG. 2. Joints and jointed shafts as well as most compensating couplings are used to compensate for small shaft misalignments. Mostly, the universal joint (cardan joint) is used. In FIG. 2, two joint yokes 33 and 34 are interconnected via universal joint trunnions 1. In the joint, joint yokes 33 and 34 can, for example, be forged. The trunnion cross is normally composed of high-grade case-hardened steel and is accommodated in roller bearings. With respect to an accurate manufacture of the sliding surfaces and to frictional losses, it is advantageous if long trunnions are used. Jointed shafts of this kind can be used in axle drives of motor vehicles or rail vehicles. For universal joints in motor vehicle construction, five to seven degrees are specified as the optimum bending angle, in particular in view of heating and efficiency. When working with too small deflection angles, there is a risk for the bearing needles and for the trunnions to flatten because of an insufficient rolling movement.

Figure 1:
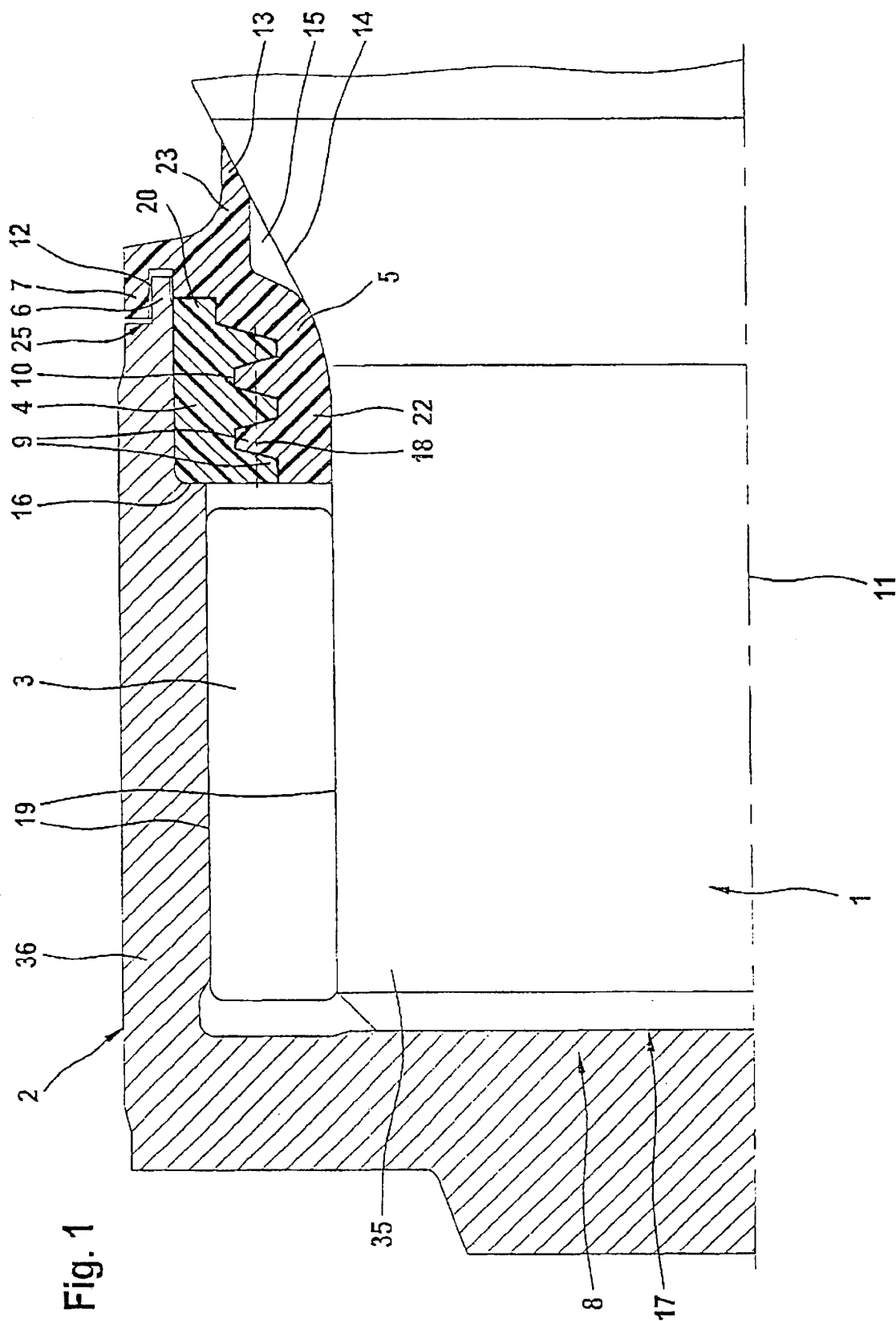
FIG. 1 shows a cross-sectional view of a seal for a universal joint cross trunnion accommodated in a bearing bush for a universal joint shaft, the seal having an outer and an inner, ring-shaped, sealing body which are insertable into the bearing bush.
Figure 3:
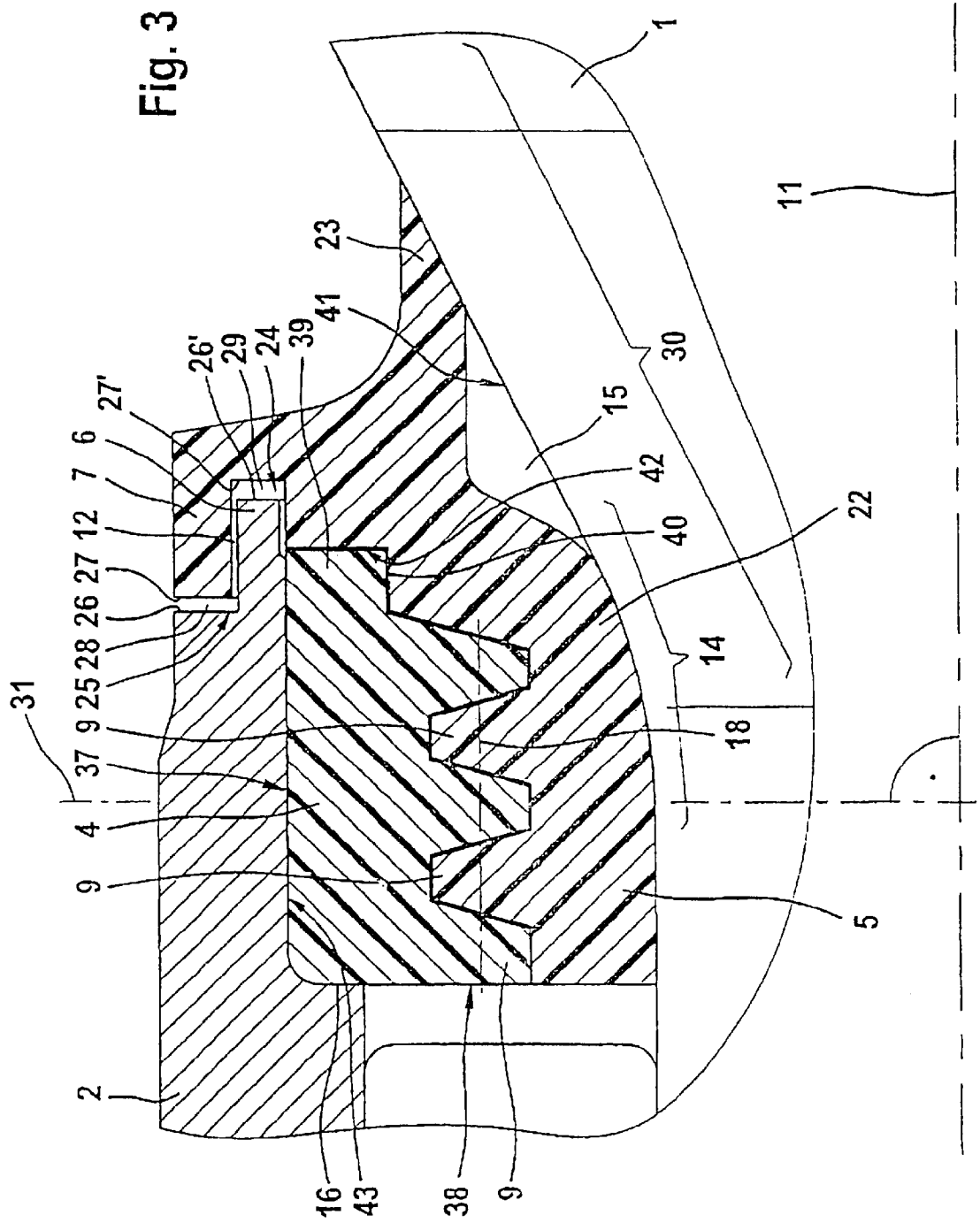
FIG. 3 shows an enlarged representation of the two sealing bodies shown in FIG. 1, including the cone region of the universal joint cross trunnion.

A special problem is the perfect sealing of the universal joint cross trunnion, which is schematically represented in FIGS. 1 and 3. A universal joint cross trunnion 1 is composed of a cylindrical trunnion part 35 which is rotatably mounted in a bearing bush 2 via a rolling element 3.

Bearing bush 2 is composed of a cylindrical housing part 36 having a bottom 8 which features a plane face 17. Located at the front-side end of bearing bush 2 is a ring-shaped recess for accommodating at least one first, outer sealing body 4 which has a ring-shaped design and is operatively connected to a second, inner sealing body 5, which likewise has a ring-shaped design, via sealing elements or sealing lamellae 9 having a positive-locking design. The two sealing bodies 4 and 5 essentially form the main sealing system between the outer and the inner regions of bearing bush 2.

Located between face 17 and two likewise opposite faces 38 of sealing bodies 4, 5 is the already mentioned rolling element 3 for bearing joint trunnion part 35 of universal joint cross trunnion 1. This interior space is advantageously sealed against foreign bodies via the two sealing bodies 4 and 5, avoiding large frictional forces.

In a ring-shaped recess 37 limited by a shoulder 16 sits the already mentioned first sealing body 4 which can be pressed into ring-shaped recess 37 for ensuring a good frictional engagement between the outer surface of sealing body 4 and the inner surface of the recess.

Appertaining to first, outer ring-shaped sealing body 4 is also second, inner sealing body 5 which has a ring-shaped design. Both sealing bodies 4 and 5 have numerous sealing elements or sealing lamellae 9 which are arranged side by side and have a labyrinth-like design and which can have a trapezoidal design in cross-section according to FIG. 3.

Sealing lamellae 9 are designed and arranged in such a manner that a small gap remains between the mutually opposing sealing surfaces so that a rotary motion is possible between the two sealing bodies 4 and 5. In the exemplary embodiment according to FIG. 3, the outer sealing body features three side-by-side sealing lamellae 9, a cylindrical extension 39 being contiguous thereto and being inserted with exact fit into a recess 40 provided in the inner sealing body 5. In this manner, the outer face of recess 40 can thrust against the face of sealing body 4 and thus, on the other hand, press sealing body 4 against shoulder 16 of bearing bush 2. In this manner, even in the case of a force fit, that the two sealing bodies 4, 5 cannot creep further into the interior of bearing bush 2, thus being able to additionally secure the position of universal joint cross trunnion 1 against axial displacement. With respect to its sealing lamella 9, second sealing body 5 is designed in a mirror-inverted manner in relation to first sealing body 4, the two opposing sealing lamellae 9 being in permanent mesh, according to FIG. 1.

According to FIG. 1, sealing body 5 at least two supporting elements 22 and 23 which are arranged at a distance from each other, the one supporting element 22 being provided in a region 14 of the cone transition. According to FIG. 3, region 14 lies between the right end of cylindrical joint trunnion part 35 and a widening cone part 30 which is contiguous thereto. Transition region 14 has a curved shape. One part of supporting element 22, 23 rests on the cylindrical part and one part of the supporting element rests on the widening part of universal joint cross trunnion 1. Contiguous to supporting element 22 in the direction of a surface 41 of cone part 30 is a chamber or recess 15 which is adjoined by second supporting element 23.

The two sealing bodies 4, 5 can be made of an elastomeric material, of thermoplastics such as polyolefins, or of a polyvinyl compound.

Outer sealing body 4 is attached to bearing bush 2 and inner sealing body 5 is mounted on universal joint cross trunnion 1 in each case via force fit to prevent foreign bodies from ingressing into the interior of the bearing bush in this manner and, also, to rule out a lubricant loss via the gap openings in the region of the joining locations. During the manufacture of the sealing device, the two sealing bodies 4 and 5 are put together prior to the installation. Outer sealing body 4 can be manufactured in a cutting or non-cutting manner and subsequently be inserted into a corresponding injection mold at which, additionally, the outside contour of inner sealing body 5 is left open. At this point, the inner sealing body can be injected, the sealing body slightly shrinking while cooling down. Because of this, a labyrinth gap forms between the surfaces of sealing lamellae 9 so that it is ensured that the cooperating sealing bodies 4 and 5 can be rotated relative to each other. A release agent is applied to the surface of outer sealing body 4 prior to the injection of inner sealing body 5 so that the sealing lamellae do not stick together. For this, it is advantageous if the sealing surfaces have a very small peak-to-valley height, or surface roughness, to keep the frictional losses small during a mutual adjustment of the sealing body. The advantageous development of the two sealing bodies 4, 5 enables them to be mounted on a universal joint cross trunnion 1, with a corresponding adaptation of any arbitrary surface. To reduce the cross-sectional height of the sealing bodies, sealing lamellae 9 are reduced in their cross-sectional height correspondingly for this purpose, resulting in a gain of structural space. Moreover, this provides the possibility for sealing bodies 4 or 5 to be easily adapted to universal joint cross trunnions having a stepped design. Due to the increase in the structural space, the inside space for accommodating rolling elements 3 is increased, as well.

It is expedient for supporting element 23 to engage on surface 41 of cone part 30 with prestress. In this manner, a perfect seal may be obtained between the outside and the inside regions of the universal joint cross trunnion.

As follows from FIG. 1, sealing lamellae 9 preferably extend in a radial direction, i.e., they extend approximately parallel to a transverse plane 31 intersecting a center axis 11 at a right angle. Located between the mutually facing surfaces of sealing lamellae 9 is an air gap or labyrinth gap 10.

The outside diameter of the outer, ring-shaped sealing body 4 is constant over the entire length of the sealing body. Located at the end of sealing body 4 is an extension 6 which extends into an annular space 24 provided in second sealing body 5. At the front-side end of bearing bush 2, provision is made for a step or recess 25 having a face 26 and a second face 26'. Extending into this step or recess 25 is an enveloping part 7 which is fixedly joined to inner, ring-shaped sealing body 5. The outside diameter of enveloping part 7 corresponds to the step of the outside diameter of bearing bush 2 in the region of face 26. Thus, extension 6 of bearing bush 2 including recess 25 also forms a labyrinth seal in conjunction with annular space 24 of inner sealing body 5. In each case one ring gap 28 and 29, respectively, are formed by faces 26, 26' of recess 25 and extension 6, faces 26, 26' running approximately parallel in relation to transverse plane 31, and by faces 27, 27' of annular space 24 and enveloping part 7, faces 27, 27' also lying on a transverse plane. The outside wall of sealing body 4 has approximately the same outside diameter as that of lower wall part 43 of recess 37. Extension 6 lies toward the outer circumference of sealing body 4 and the bottom of annular space 24, thus also forming a labyrinth-like sealing gap 12. Enveloping part 7 and the two supporting elements 22 and 23 which, as already mentioned, act as sealing elements, form a one-part sealing body which is pressed onto cone part 30. Via its inner face, extension 39 abuts against the front-side end of inner sealing body 5 and, in the position according to FIG. 3, presses sealing body 4 against shoulder 16. In this manner, the axial movement of universal joint cross trunnion 1 in the direction of bottom 8 is limited, as well. The axial fixing in position of universal joint cross trunnion 1 is also effected by the engagement of the inner face of joint cross trunion 1 on face 17 of bottom 8.

What is claimed is:

1. A seal for a universal joint cross trunnion disposed in a bearing bush for a universal joint shaft, the seal comprising:
   an outer ring-shaped sealing body insertable into the bearing bush and including first sealing elements; and
   an inner ring-shaped sealing body insertable into the bearing bush and being operatively connected to and mutually adjustable with the outer sealing body, the inner sealing body including second sealing elements meshing with the first sealing elements in a positive-locking manner, the inner sealing body including an enveloping part overlapping the bearing bush at least partially.

2. The seal as recited in claim 1 wherein the first and second sealing elements include labyrinth-like lamellae.

3. The seal as recited in claim 1 wherein the sealing bodies further include at least one supporting element disposed on the universal joint cross trunnion in the region of a cone transition of the universal joint cross trunnion.

4. The seal as recited in claim 1 wherein the sealing bodies further include at least a first and a second supporting element disposed at a distance from each other, the second supporting element being disposed on an inclined cone surface contiguous to a cone transition of the universal joint cross trunnion.

5. The seal as recited in claim 1 wherein the sealing bodies further include at least a first and a second supporting element, the first and the second supporting elements defining therebetween a chamber or recess directed toward the surface of the universal joint cross trunnion.

6. The seal as recited in claim 1 wherein the enveloping part defines an annular space running coaxially to a center axis of the cross trunion and being for receiving a ring-shaped extension of the bearing bush.

7. The seal as recited in claim 1 wherein the enveloping part is insertable into a recess defined by ring-shaped extension of the bearing bush disposed at the outer sealing body, the recess being rectangular in cross-section.

8. The seal as recited in claim 1 wherein the enveloping part having a first face at a first end thereof and defining an annular space, the annular space having a second face at a second end thereof, the enveloping part being insertable into a recess defined by a ring-shaped extension of the bearing bush disposed at the outer sealing body, the extension having a third face and the recess having a fourth face, the first, second, third and fourth faces being generally orthogonal to a center axis of the cross trunion, the first and fourth faces forming a first ring gap therebetween, the second and third faces forming a second ring gap therebetween.

9. The seal as recited in claim 1 wherein the inner sealing body further includes at least a first and a second supporting element disposed at a distance from each other, and wherein the inner sealing body includes an elastomeric material pressed onto the universal joint cross trunnion.

10. The seal as recited in claim 9 wherein the elastomeric material is pressed onto a cone part of the universal joint cross trunnion.

11. The seal as recited in claim 1 wherein the inner sealing body further includes at least a first and a second supporting element disposed at a distance from each other, at least one of the first and second supporting elements including a sealing lip disposed on a cone part of the universal joint cross trunnion with prestress.

12. The seal as recited in claim 1 wherein the first and second sealing elements include labyrinth-like lamellae extending in a direction generally orthogonal to a center axis of the universal joint cross trunnion.

13. The seal as recited in claim 1 wherein the bearing bush includes a bottom having an inner face and wherein the inner and outer sealing bodies include respective side faces opposite the inner face, the inner face and the respective side faces defining a space therebetween for receiving a rolling element for the universal joint cross trunnion.

14. The seal as recited in claim 1 wherein the enveloping part defines an annular space running coaxially to a center axis of the cross trunnion and receiving a ring-shaped extension of the bearing bush.

* * * * *